United States Patent [19]
Barnes et al.

[11] Patent Number: 6,072,485
[45] Date of Patent: Jun. 6, 2000

[54] NAVIGATING WITH DIRECTION KEYS IN AN ENVIRONMENT THAT PERMITS NAVIGATING WITH TAB KEYS

[75] Inventors: David A. Barnes, Seattle; David William Plummer; Joseph H. Matthews, III, both of Redmond, all of Wash.

[73] Assignee: Microsoft Corporation, Redmond, Wash.

[21] Appl. No.: 08/919,679

[22] Filed: Aug. 28, 1997

[51] Int. Cl.$^7$ ........................................................ G06F 3/00
[52] U.S. Cl. ............................ 345/339; 345/163; 345/173
[58] Field of Search ..................................... 345/163, 145, 345/146, 157, 147, 173, 333, 335, 339

[56] References Cited

U.S. PATENT DOCUMENTS

| | | | |
|---|---|---|---|
| 4,698,625 | 10/1987 | McCaskill et al. | 345/145 |
| 4,755,808 | 7/1988 | Bulloct et al. | 345/173 X |
| 5,305,449 | 4/1994 | Ulenas | 345/173 X |
| 5,642,131 | 6/1997 | Pekelney | 345/145 |
| 5,757,358 | 5/1998 | Osga | 345/146 |

FOREIGN PATENT DOCUMENTS 0698985  2/1996  European Pat. Off. .

Primary Examiner—Raymond J. Bayerl
Attorney, Agent, or Firm—Banner & Witcoff, Ltd.

[57] ABSTRACT

A technique for adapting a GUI which is not able to respond to directional navigation inputs which move a focus by specifying a location and a direction from a location to respond to such navigation inputs. The adaptation is done by means of a function which takes the location and the direction as arguments and moves the focus to the area capable of receiving it that is closest to the location specified in the argument in the direction specified in the argument. The function uses a non-directional navigation technique provided by the GUI to obtain each area which is a candidate for receiving the focus in turn and as each area is received, the function determines whether the area is located in the specified direction relative to the specified location and if the area is, whether it is closer to the specified location than any area as yet found. Once all of the areas have been thus examined, the focus is moved to the closest area. A preferred embodiment is disclosed which adapts a WINDOWS brand operating system manufactured by Microsoft Corporation for use with a directional pointing device such as a TV remote controller with direction buttons.

49 Claims, 8 Drawing Sheets

NAVIGATING WITH DIRECTION KEYS IN AN ENVIRONMENT THAT PERMITS NAVIGATING WITH TAB KEYS

BACKGROUND OF THE INVENTION

1. Field of the Invention

The invention concerns interactive computer systems generally and more specifically concerns navigation in graphical user interfaces.

2. Description of Related Art

FIG. 1 shows a typical portion 101 of a display produced by a program that is using a graphical user interface. A graphical user interface (GUI) permits the user to follow and control operation of the program. The GUI produces a display of the current status of the program on a display device belonging to the computer system and the user can interact with the display by means of a pointing and selection device such as a mouse. A display produced by a GUI typically contains a number of active areas 103, that is, areas which, when selected by means of the pointing device, cause the program using the GUI to perform some action. An active area may be a button, for example active area 103(a), text, for example active area 103(j), or any area of the display which may be navigated to and selected. The action performed when an active area is selected is of course defined completely by the program using the GUI. For example, selection of active area 103(a) in FIG. 1 causes the program to "back up", that is, display a set of information which precedes the one it is currently displaying. Thus, to make the program "back up", the user of the program navigates to active area 103(a) and then selects the active area. Focus indicator 105 moves as the user navigates and indicates which active area is currently the focus, i.e., which active area will be selected if the user does the selection at that point in time. There are of course many forms of focus indicator; in FIG. 1, focus indicator 105 is a frame around the active area, but it may also be some other kind of cursor or the focus may be indicated by changing the appearance of the active area itself, for example, by highlighting it, making it blink, or displaying it in reverse video.

Navigation in a GUI is generally done by means of a movable pointing device such as a mouse, stylus, joystick, pressure sensitive pad, or track ball. With all of these devices, the user moves an object and the motion of the object is translated into motion of focus indicator 105 in the graphical user interface. There are, however, situations in which it is not practical to use a movable pointing device. One such situation is when the GUI is part of a program that controls a television set and is consequently displayed on the screen of the television set. Users of television sets are accustomed to remote controllers with buttons, not to movable pointing devices, and cost constraints make it difficult to add a movable pointing device to a remote controller. Another such situation is when the program that the GUI belongs to must run on a computer which does not have a movable pointing device.

In both situations, navigation techniques have been developed which use buttons to navigate instead of movable pointing devices. Many GUIs that are designed for use with movable pointing devices also permit the user to navigate among active areas 103 by means of the tab key on the keyboard. The tab key has two modes, forward tabbing and back tabbing, and consequently, the tab keys cannot be used to indicate motion in two dimensions, as would normally be required in a GUI. This problem is solved with a list of active areas; the current position in the list is that of the active area 103 at which focus indicator 105 is located; each time the tab key is struck in forward tabbing mode, focus indicator 105 is moved to the next active area on the list; each time the tab key is struck in back tabbing mode, focus indicator 105 is moved to the previous active area on the list. While this technique works, it may require many keystrokes. For instance, if the active areas in GUI portion 101 are linked together in a list which begins with area 103(a) and continues in left-to-right and top-to-bottom order through area 103(n), a user who wishes to navigate from area 103(i) to area 103(n) must push the tab key 5 times, even though area 103(i) is directly over area 103(n). In the following, navigation techniques like the one just described which do not take direction into account in moving the focus will be termed non-directional navigation techniques. Remote controllers have been developed for television sets that display GUIs. These remote controllers often have direction buttons that may be used to navigate from active area to active area in the GUI. An example of such a remote controller and of a GUI with which it is used are disclosed in published European patent application EP 0 698 985 A2, Balk, et al., Apparatus for Providing a Graphical Control Interface, published Feb. 28, 1996 in Bulletin 1996/09. As disclosed at FIG. 6 of that reference, the remote controller has four direction buttons, up, down, left, and right. As indicated at column 10, lines 6–8, these buttons are "for navigating from one field to another in menus; the up arrow indicates the next field up, the down arrow the next field down, and so forth." Thus, in such a system, a user would navigate from active area 103(i) to active area 103(n) by pushing the controller's down button. Such a system could of course also be used with the direction keys on a standard computer keyboard. Another example of a navigation system that uses direction keys is that employed in the Internet access system developed by WebTV Networks, Incorporated. The WebTV Internet access system employs a television set as a display device and uses a modified remote controller with direction keys for navigation. In the following, pointing devices that work like those just described by specifying a direction with reference to a current position in the display will be termed directional pointing devices.

In the past, computer systems which used a movable pointing device for navigation and systems which used directional pointing devices belonged to different worlds; at present, the increasing availability of the Internet and of interactive TV are making these worlds come together, resulting in a need for an easy way to adapt GUIs that were designed for non-directional navigation techniques to navigation by means of directional pointing devices.

SUMMARY OF THE INVENTION

The problem of adapting a GUI that employs a non-directional navigation technique for use with a directional pointing device is solved by means of an adapter for the GUI which works by receiving an indication of the direction specified by the directional pointing device and using the non-directional navigation facilities of the GUI to take the active areas of interest in an order that is determined by the non-directional navigation facilities. Each active area's location in the display is compared with the location in the display that the direction specified by the directional pointing device is relative to, and the active area that is closest to the location that the direction is specified from in the specified direction receives the focus. Thus, from the point of view of the user of the program, the GUI with the adapter appears to work in the same fashion as a GUI that is designed to work with a directional pointing device.

In other aspects of the invention, the technique used to determine which active area is closest to the location from which the direction is specified does not require that the active area be either vertically or horizontally aligned with that location. Moreover, the technique can locate the active areas at their current locations in the display, and can thus be used with active areas that change their positions in a window.

The foregoing objects and advantages of the invention will be apparent to those skilled in the arts to which the invention pertains upon perusal of the following Detailed Description and drawing, wherein:

Figure 1:
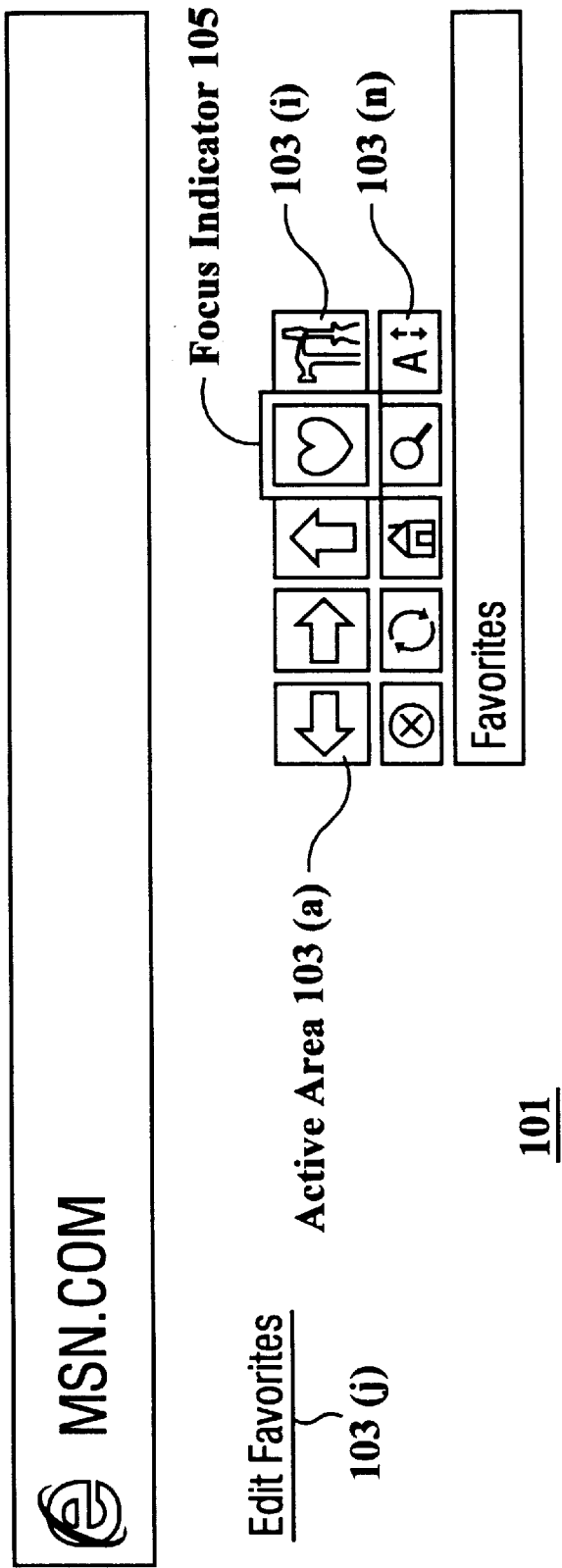
FIG. 1 shows a portion of a display produced using a GUI.

The reference numbers in the drawings have at least three digits. The two rightmost digits are reference numbers within a figure; the digits to the left of those digits are the number of the figure in which the item identified by the reference number first appears. For example, an item with reference number 203 first appears in FIG. 2.

DETAILED DESCRIPTION

The following Detailed Description will first present an overview of a technique for adapting a GUI which uses non-directional navigation for use with a directional pointing device and will then describe the technique in detail in a GUI in which the tab key is used for non-directional navigation and will finally show how it can be used for navigation to active areas which are not vertically or horizontally aligned with the location from which the direction of navigation is specified.

Figure 2:
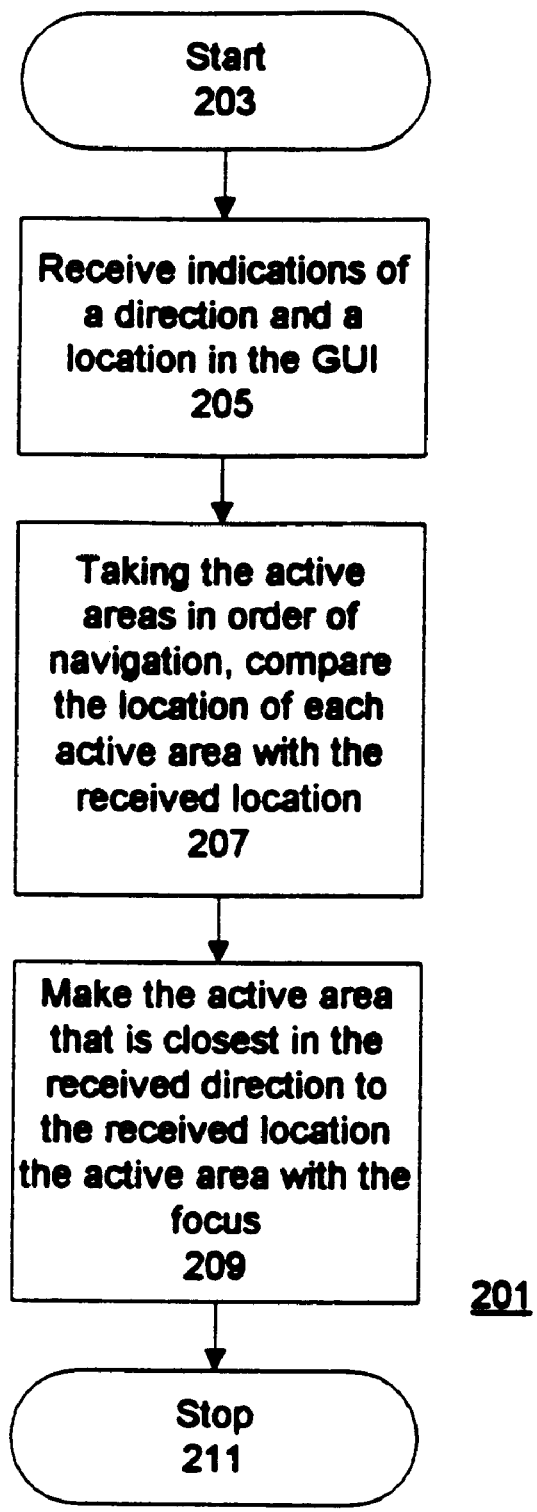
FIG. 2 is a high-level flowchart of the technique for adapting the GUI.
Figure 7:
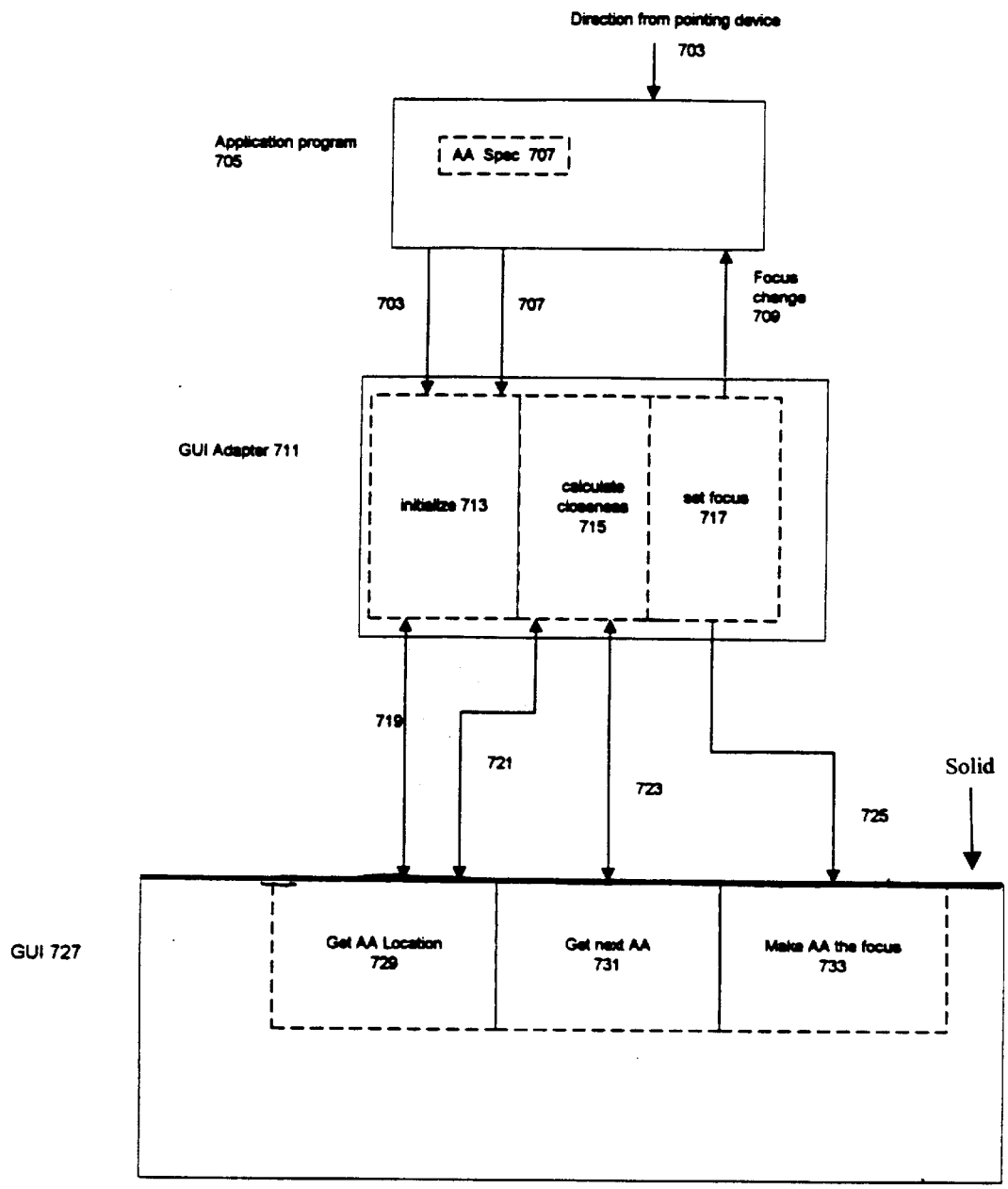
FIG. 7 is a block diagram of apparatus for performing the adaptation technique.

Overview of the Technique: FIGS. 2 and 7

FIG. 2 shows a high-level flowchart 201 of the technique. The first step (205) is to receive indications of the direction of navigation from the directional pointing device and of a location in the display. The second step (207) uses the non-directional navigation provided by the GUI being adapted to take each active area that is of interest for the navigation being performed in turn. As each active area is taken, its location is compared with that of the received location. In the third step (209), the active area that is closest in the received direction to the received location is made the active area with the focus. It should be noted here that the technique will work with any navigation technique which permits navigation through the active areas in a fashion which guarantees that all of them will be examined. It should also be noted that the definition of closest may be varied to suit the characteristics of the GUI.

FIG. 7 shows a high-level block diagram of apparatus which implements the technique. Apparatus 701 is implemented in a program executing on a computer system. Application program 705 receives inputs from a directional pointing device 703 which GUI 727 cannot use for navigation because it has no facilities for directional navigation. This problem is solved by means of GUI adapter 711, which receives the directional inputs and the location in the display to which the direction is relative and uses them together with the non-directional navigation facilities of GUI 727 to locate the active area that is closest to the location in the specified direction and to move the focus to that active area. The non-directional navigation facilities of GUI 727 include a function 729 which takes a specifier for an active area and returns the location of the active area on the display, a function 731 which returns the next active area according to the system of non-directional navigation used in GUI 727, and a function 733 which takes a specifier for an active area and sets the focus to the active area specified by the active area specifier.

Application program 705 receives a direction indication 703 from the pointing device and has active area specifier 707 which indicates which area of the display the direction is relative to. Application program 705 provides active area specifier 707 and direction information 703 to adapter 711. Adapter 711 has three main subcomponents: initialization portion 713, closeness calculation portion 715, and focus setting portion 717. Initialization portion 713 receives direction information 703 and active area information 707 and sets up adapter 711 for operation with that information. Among the tasks performed by initialization portion 719 is using a function 729 of GUI 707 to get the location of the active area specified in active area specifier 707 (arrow 719).

Closeness calculation portion 715 uses get next AA function 731 to get the active area specifier for each active area specified by the non-directional navigation technique used in GUI 727 (arrow 723). As it receives the specifier for each active area, it uses get AA location function 729 with the active area specifier to get the location of that active area (arrow 721) and determines whether it is closer in direction 703 to active area 707 than any yet found. If it is, it becomes the current closest active area. When all of the active areas have been examined, the current closest active area (if any) is the active area which should receive the focus, and set focus 717 uses function 733 to give the active area the focus (arrow 725). As shown at arrow 709, if the active area has changed, adapter 711 returns the value TRUE to the adapter; otherwise, it returns FALSE.

Figure 3:
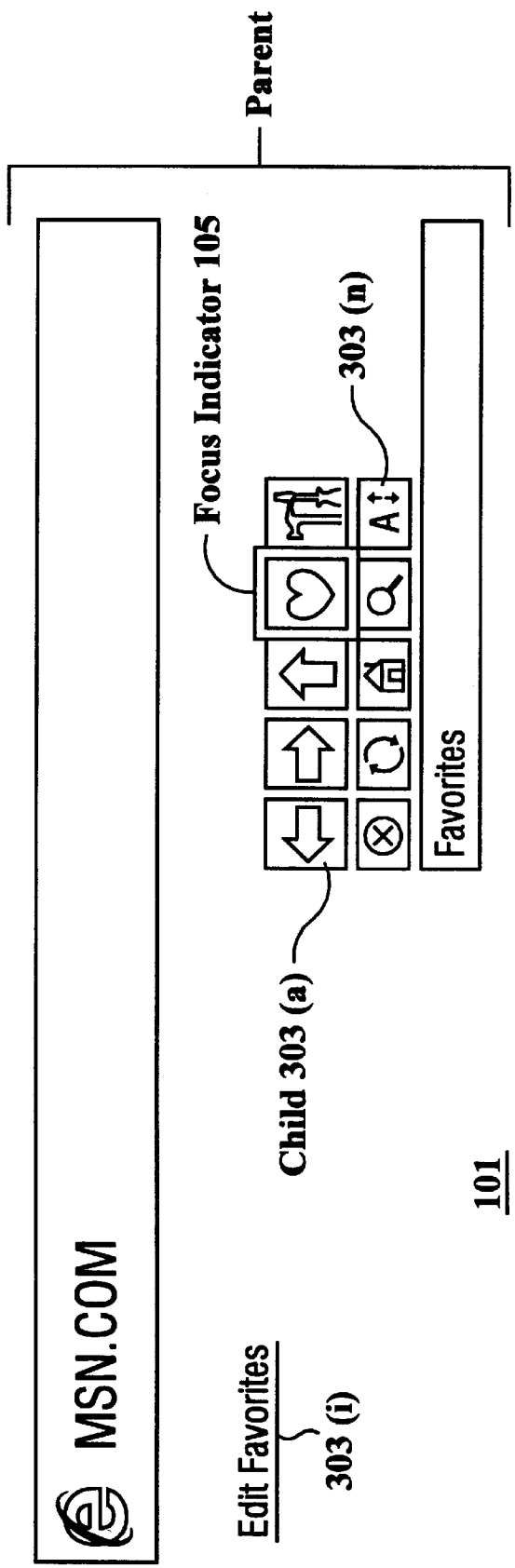
FIG. 3 shows how windows are related in an exemplary implementation.
Figure 4A:
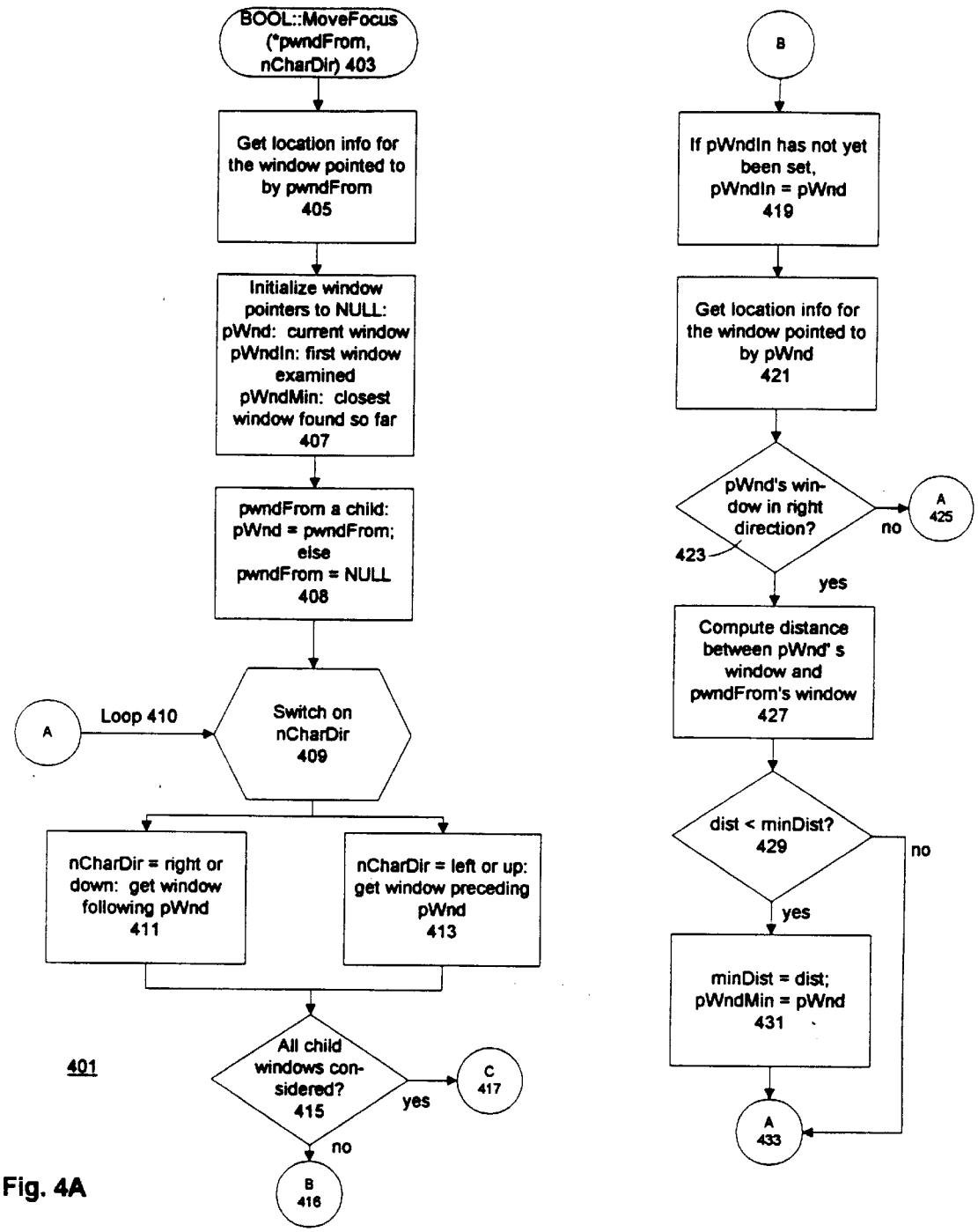
FIGS. 4A and 4B are a low-level flowchart of an exempary implementation of the adaptation technique.
Figure 4B:
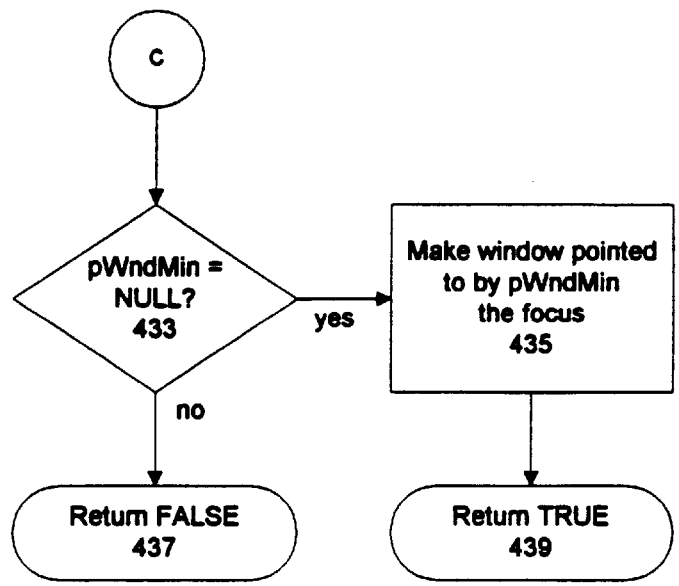

Detailed Implementation of the Technique: FIGS. 3, 4A, and 4B

In an exemplary implementation, the technique is implemented in the programming environment provided by the WINDOWS brand operating system manufactured by Microsoft Corporation. The following description of the detailed implementation will begin with a discussion of those portions of the WINDOWS brand operating system that are relevant to the exemplary implementation and will continue with a discussion of the implementation itself.

GUIs in the WINDOWS Brand Operating System

In the environment provided by the WINDOWS brand operating system, the graphical user interface is organized as a hierarchy of windows. The hierarchy is shown in FIG. 3, which is the display portion 101 of FIG. 1. Display portion 101 is made up of 11 windows, a parent window 301 and child windows 303(*a*) through 303(*n*) contained in parent window 301. The child windows 303(*a*) through 303(*n*) are of course also the active areas 103(*a.n*) of display portion 101.

The WINDOWS brand operating system provides programmers with a number of ways of manipulating a window in a GUI. Ways that are important for the present discussion are <window class object>—>GetWindowRect(<pointer>) is an operator that takes a data structure representing a window (the window class object) and writes an object of the rect class into the area in memory specified by the pointer. An object of the rect class represent the rectangle in the display associated with a window. The rect class has members of the top, bottom, left, and right classes which represent the sides of the rectangle. The rect class also has an operator, CenterPoint0, which returns the x and y coordinates of the center point of the window.

IsChild(<window class object>) is a function which determines whether the window represented by the window class object is a child of the window in which the program's GUI is running.

<window class object>—>SetFocus0 is an operator that takes a data structure representing a window and sets a value in the data structure that indicates that the window is currently the focus.

The WINDOWS brand operating system also provides programmers with a function, GetNextDlgTabItem (<window class object pointer>, <direction specifier>), which is used to implement tab key navigation. A programmer who is writing an application program that runs on the WINDOWS brand operating system and who wants to use tab key navigation in the application program must provide the operating system with a circular list of the child windows in the application program's window that the user of the application window will be able to tab to. The GetNextDlgTabItem function takes as its arguments a window class object pointer to one of the child windows on the list and a Boolean value that specifies a direction. If the Boolean value is TRUE, the function returns the window on the list that precedes the window specified by the window class object pointer; if it is FALSE, the function returns the window on the list that follows the window specified by the window class pointer. If the window class object pointer has the value NULL, the GetNextgDlgTabItem function returns a predetermined child window on the list.

Detailed Implementation: FIGS. 4A and 4B

FIGS. 4A and 4B are a detailed flowchart 401 of the exemplary implementation. As shown at 403, the flowchart represents a function MoveFocus(*pwndFrom, nCharDir) which moves the focus to the child window of the window for the program that has been indicated by the direction button. The function takes as its arguments a pointer (*pwndFrom) to the window from which the distance is to be computed (typically, the window that currently has the focus) and a value (nCharDir) which indicates the direction. The function returns a Boolean value which is TRUE if the focus has been moved and otherwise FALSE. In the exemplary implementation, nCharDir can specify up, down, right, or left. In other embodiments, it may specify more or fewer directions, and the application using MoveFocus can also handle other directions by making a series of calls to MoveFocus; for example, it can respond to an input indicating a move in a diagonal to the up and left by calling MoveFocus once specifying the upward direction and once specifying the leftward direction.

Flowchart 401 has three main parts: an initialization portion (elements 405–408), a main processing loop 410 (elements 409–431), which locates the child window that is closest to the window with the focus in the desired direction, and a focus changing portion (elements 433–439) which changes the focus if possible and returns a Boolean value indicating the function's success or failure. Beginning with the initialization portion, the first step (405) is to get the location information for the window pointed to by pwndFrom. This will normally be the window which currently has the focus. The information is obtained using the GetWindowRect operator explained above. Next, the local window pointers are initialized to NULL (407). There are three local window pointers:

pWnd is a pointer to the window currently being processed in loop 410;

pWndIn is a pointer to the first window to be processed in loop 410;

pWndMin is a pointer to the closest window in the direction specified by nCharDir to the window pointed to by pwndFrom that has so far been found in loop 410.

The final step (408) in the initialization deals with the possibility that the window pointed to by pwndFrom may not be a child of the window in which the program invoking MoveFocus is running. If the window is a child, it must be examined in loop 410; otherwise, all that is needed for the loop is the window's location information, which has already been retrieved and saved in step 405. Thus, if pwndFrom's window is a child, the pointer is assigned to pWnd for processing in loop 410; otherwise, pwndFrom is set to NULL.

Switch 409 switches between two modes of processing the circular list of child windows, depending on the direction specified by nCharDir. If the direction is right or down, pWnd is set to point to the window following the window pointed to by pWnd (411) in the last iteration of loop 410; if it is up or left, pWnd is set to point to the window preceding the window pointed to by pWnd (413). In each case, the next window is fetched using the GetNextDlgTabItem function with pWnd as the pointer argument and the Boolean argument required by the direction in which the circular list is being traversed.

If all of the child windows have been examined by loop 410, the loop terminates, as shown at decision block 415, and the last portion of the program is executed, as indicated by connector C 417. There are three conditions which indicate that all child windows have been examined. First, if pWnd==pwndFrom (=means "is equal to"), pwndFrom is a child of the program's window and was therefore starting point in the list. Since it has been reached again, all children have been examined. Second, if pWnd ==pWndIn, pwndFrom is not a child of the program's window and was not a starting point. pWndIn, however, was the starting point and has again been reached. Third, if pWnd==NULL, the program's window has no children and there is no examining to do.

If there are still child windows to consider, execution continues at element 419, which sets pWndIn from pWnd the first time loop 410 reaches element 419. The next step (421) is to get the location information for pWnd's window. This is done using the GetWindowRect operator described above. At decision block 423, the location information is used to determine whether pWnd's window has a location on the display relative to the stored location of pwndFrom's window which is in the direction indicated by nCharDir. If it does not, the function returns to switch 409 to get the next child window (connector A 425). In the exemplary implementation, the determination whether pWnd's window is in the relevant direction from pwndFrom's window is done using the locations of the windows' sides. For example, if the direction is to the right and the location of pwnd's window's left-hand side is less than (to the left of) the location of pwndFrom 's right-hand side, the window pointed to by pWnd will not be further considered.

If pWnd's window is located in the proper direction relative to pwndFrom's window, the x and y distances between the two windows is calculated (427). The x distance is computed in the exemplary implementation by subtracting the x coordinate of the center of pWnd's window from the x coordinate of the center of pwndFrom's window and squaring the difference; the same is done with the y components of the centers to compute the y distance. In addition, either the x or y distance may be biased according to the direction specified by nCharDir. The x distance is biased if the direction is right or left and the y distance is biased if the direction is up or down. Biasing is done in the exemplary implementation by multiplying the distance to be biased by a biasing constant. The distance between the two windows, dist, is then computed by adding the x distance to the y distance. As will be explained in more detail in the following, one advantage of the above technique (with or without biasing) for computing distance is that the focus will move to a child window that is closest in a given direction even though the child window is not aligned in the specified direction with the window that currently has the focus.

Once dist has been computed, it is compared with minDist, the shortest distance thus far obtained between pwndFrom's window and a child window that lies in the proper direction from pwndFrom's window (429). If it is less, minDist is set to dist's value and pWndMin is set to pWnd (431) and loop 410 is repeated (connector A 433); If dist is greater than or equal to minDist, the loop is repeated without setting minDist or pWndMin. When loop 410 terminates, pWndMin will contain a pointer to the child window which is closest in the direction specified by nCharDir to the location of pwndFrom's window. It should be mentioned here that the location of each window that is compared with pwndFrom 's window is the location it has when its pointer is returned by the GetNextDlgTabItem function; consequently, the locations of the windows may change during the execution of the program they belong to.

On termination of loop 410, the focus changing portion of the function, shown in FIG. 4B, is entered. There, the first thing that is done is testing pWndMin to see whether it has a NULL value (433). In that case, there are no child windows in the specified direction from the location specified by pwndFrom's window, the focus cannot be moved, and the MoveFocus function returns FALSE (437). Otherwise, pWndMin's window is the closest child window in the specified direction, and at 435, the SetFocus operator is used to make that window the focus. Thereupon, the MoveFocus function returns TRUE (439).

Figure 5:
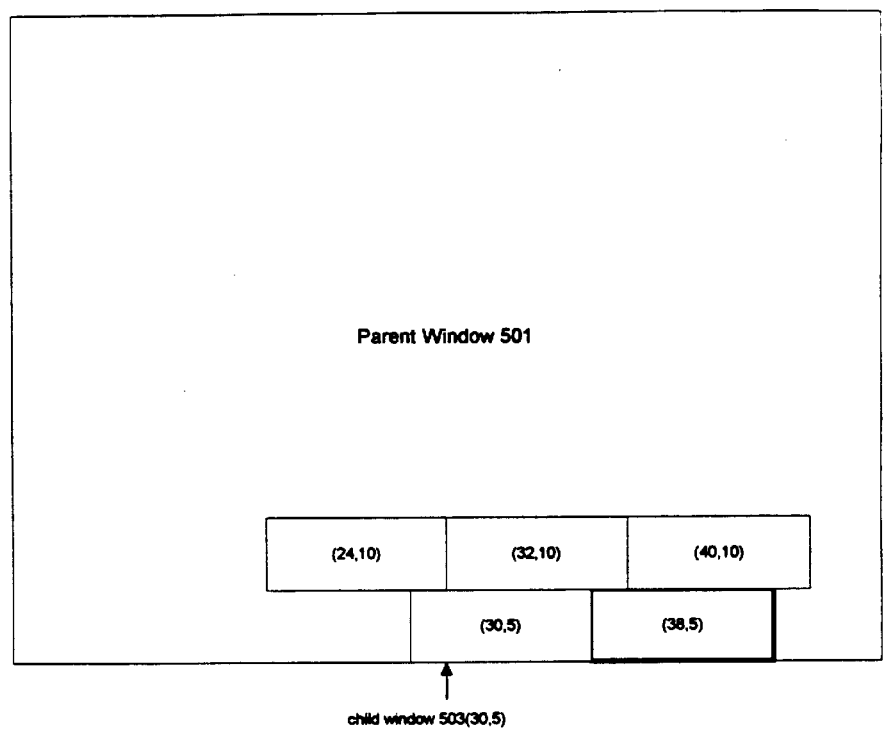
FIG. 5 shows how the adaptation technique can be used with active areas that are not aligned vertically or horizontally with the active area at which navigation begins.

Example Distance Computation: FIG. 5

FIG. 5 provides an example of the distance computation and shows how the computation works even with child windows that are not vertically or horizontally aligned with the position from which the nearest child window is to be computed. FIG. 5 shows a parent window 501 with 5 child windows 503. The x and y coordinates of each of the child windows are shown in the center of the child window. A given child window in FIG. 5 will be identified by its coordinates, for instance, child window 503(30,5). Child windows 503(24,10) through (40,10) are not vertically aligned with child windows 503(30,5) and (38,5). Child window 503 (38,5) presently has the focus. The user of the program to which parent window 501 belongs has just pushed the up button on his controller.

As explained above, the MoveFocus function will begin with the child window 503 which precedes window (38,5) in the list of child windows and will examine every window in the list until it again reaches window (38,5). In window 501, all of the child windows but child window 503(30,5) lie in the right general direction; consequently, the distance of each of these to window 503(38,5) will be calculated. Beginning with child window 503(24,10), the calculation is as follows:

x distance: 24−38=−14;−14*−14=196
y distance: 10−5=5;5*5=25
dist: 196+25=221 child window 503(32,10):
x distance: 32−38=−6;−6*−6=36
y distance: 10−5=5;5*5=25
dist: 36+25=61 child window 503(40,10):
x distance: 40−38=2;2*2=4
y distance: 10−5=5;5*5=25
dist: 4+25=29

Since dist is smallest for child window 503(40,10), it will receive the focus.

Figure 6:
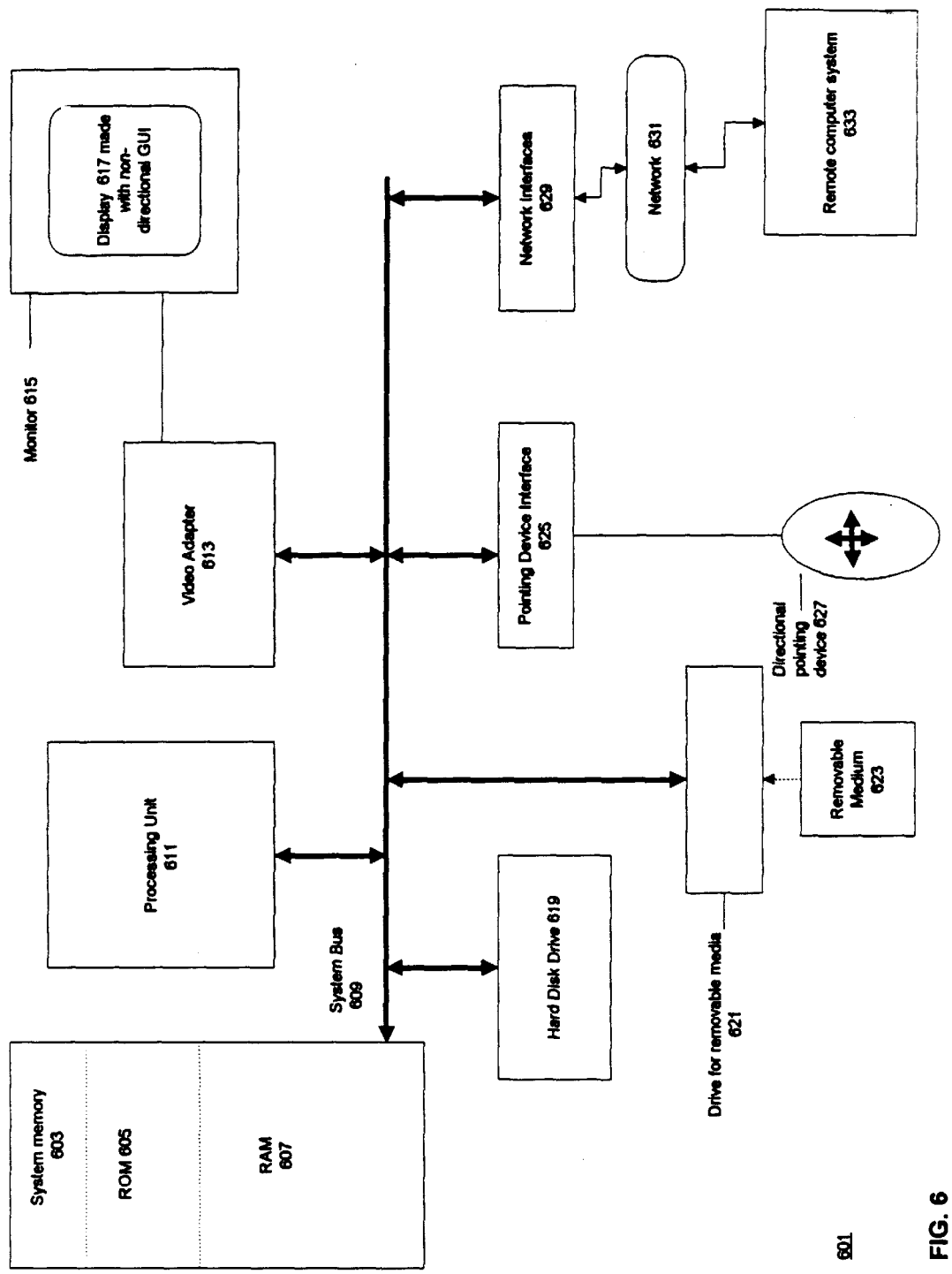
FIG. 6 is a block diagram of a system in which the adaptation technique may be employed.

A System in which the Technique may be used: FIG. 6

FIG. 6 shows a typical system 601 in which the technique just described may be used. System 601 includes system memory 603, processing unit 611, which executes programs stored in system memory 611, and a number of peripheral devices connected like processing unit 611 and memory 603 to system bus 609. The peripheral devices provide data and programs to and receive data and programs from processing unit 611 and memory 603. Included in these devices are a hard disk drive 619, which provides persistent storage of programs and data when the programs or data are not loaded into memory 603, a drive for removable media 621, which may be a drive for a device such as a floppy disk or CD-ROM which contains data or programs that may be used in system 601, video adapter 613, which provides an interface to a monitor 615 in which outputs of the program are displayed, pointing device interface 625, from which directional pointing inputs may be obtained from a directional pointing device 627, and network interfaces 629, which provide interfaces by means of which system 601 may communicate via a network 631 may communicate with one or more remote computer systems 633. The display 617 in monitor 615, finally, is produced using a non-directional GUI, that is, a GUI which is not normally responsive to inputs from a directional pointing device 627.

When the technique for adapting the non-directional GUI to a directional pointing device 627 is being carried out, a program containing an implementation of the technique is stored in system memory 603 and is being executed by processing unit 611. In response to a directional input from directional pointing device 627, the program carries out the technique as described above. When the program is not being stored in system memory 603, it may be stored on hard disk drive 619 or on a removable medium 623. It may also have been downloaded via network 631 from a remote computer system 633, where the program may be stored in any of storage devices of the type of memory 603, drive 619, or removable reader 613 that are part of that system.

Conclusion

The foregoing Detailed Description has disclosed a technique for adapting a non-directional GUI for use with a directional pointing device in such fashion that those skilled in the arts to which the technique pertains can make and use the technique. The Detailed Description has further disclosed the best mode presently known to the inventors of practicing the technique. As will be immediately apparent to those skilled in the arts to which the technique pertains, there are many ways of implementing the principles of the technique. For example, the technique may be used with any non-directional technique for moving the focus to an active area; all that is required is that the locations of all of the active areas of interest are obtained. There is thus no requirement that the tab key be used to move the focus or that the areas of interest are windows. All that is required of the directional pointing device is that it specify a direction with reference to an area of the display. There is no requirement that the directional pointing device use any particular hardware for specifying a direction or that it be able to specify any particular number of directions.

The technique is further not dependent on any particular operating system or on the constructs provided by any particular programming language. Moreover, many ways of implementing the details of the technique are possible. For instance, any technique may be used to examine the active areas of interest, as long as all of them are examined. There are similarly many techniques for determining which of the active areas of interest is closest in the specified direction to the location in the display from which the direction is being specified. Often, the manner of determining closeness will depend on the GUI. For example, in a GUI in which the active area that receives the focus is always vertically or horizontally aligned with the location from which the direction is specified, there would be no need to use both the x and y components to compute the distance between active areas. For all of the foregoing reasons, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

What is claimed is:

1. A method of adapting a GUI in which a focus is moved nondirectionally among a plurality of active areas located in a display such that the GUI can be used with a directional pointing device that specifies a desired direction relative to a current location in the display, the method comprising the steps of:

receiving an indication of the desired direction for moving the focus, the indication being specified by the direction pointing device;

taking at least one of the active areas in an order in which the active areas would normally receive the focus when the focus is moved nondirectionally;

returning a location in the display for each of the active areas taken;

comparing the location of each active area taken with the current location of the focus in the display; and moving the focus from the current location to one of the plurality of active areas whose location in the specified direction is closest to the current location in the display.

2. The method set forth in claim 1 wherein:

the order is such that each active area is visited in turn; and in the step of taking the active areas, the taking continues until the first active area taken is again reached.

3. A computer-readable medium having computer-executable instructions for the steps recited in claim 2.

4. The method set forth in claim 2 wherein:

the GUI includes a function that returns a next one of the active areas relative to a current one of the active areas, the function being used to determine the order; and the step of taking the active areas employs the function.

5. A computer-readable medium having computer-executable instructions for the steps recited in claim 4.

6. The method set forth in claim 4 wherein:

the order in which the function returns the active areas is determined by circular list of the active areas;

the function includes a parameter which specifies whether the next active area is the active area in the list that precedes or follows the current active area; and the step of taking the active area determines the parameter from the direction of the next active area with respect to the current active area.

7. The method set forth in claim 1 wherein:

the GUI provides windows to programs being executed, the windows including parent and child windows;

the step of receiving an indication of a direction further includes the steps of receiving a specification of a window, determining a location of the window, and using the determined location as the location in the display; and in the step of taking the active areas, the active areas are child windows of a parent window belonging to a program.

8. A computer-readable medium having computer-executable instructions for the steps recited in claim 7.

9. The method set forth in claim 1 wherein the step of comparing each active area's location comprises the steps of:

determining whether the active area is in the specified direction from the current location; and if the active area is in the specified direction, determining the closeness of the active area to the location in the display.

10. A computer-readable medium having computer-executable instructions for the steps recited in claim 9.

11. The method set forth in claim 9 wherein the step of determining the closeness of the active area further comprises the steps of:

determining whether the active area is the closest active area yet found by comparing the active area with a current closest active area; and if the active area is the closest active area yet found, making the active area the current closest active area; and in the step of making that active area, making the current closest active area after locations of all the active areas have been compared with the current location in the display the active area with the focus.

12. A computer-readable medium having computer-executable instructions for performing the steps recited in claim 11.

13. The method set forth in claim 9 wherein:

the step of determining the closeness of the active area to the current location in the display does not require that the active area be in vertical or horizontal alignment with the current location in the display.

14. A computer-readable medium having computer-executable instructions for performing the steps recited in claim 13.

15. The method set forth in claim 9 wherein each active area and the current location in the display have associated therewith the x and y coordinates of a point in the active area or the location and the step of determining the closeness of the active area further comprises the steps of:

deriving an x distance from the difference between the x coordinate of the point in the active area and the x coordinate of the point in the current location;

deriving a y distance from the difference between the y coordinate of the point in the active area and the y coordinate of the point in the current location; and using the x distance and the y distance to compute the distance between the active area and the current location.

16. A computer-readable medium having computer-executable instructions for performing the steps recited in claim 15.

17. The method set forth in claim 15 wherein the step of determining the closeness of the active area further comprises the step of:
combining a biasing value with either the x distance or the y distance depending on the received indication of the direction.

18. The method set forth in claim 15 wherein:
the coordinates of the point in the current location and the coordinates of the point in the active area are the current coordinates of the points in the display.

19. The method set forth in claim 1 wherein:
the position of each active area and the position of the current location in the display are the current positions in the display of the active areas and the current location, whereby the method is effective with active areas whose positions change dynamically.

20. A computer-readable medium having computer-executable instructions for performing the steps recited in claim 1.

21. A method of using an input from a pointing device that specifies a direction relative to a first location in a display to move a focus to an active area of a plurality of active areas in the display that is the closest active area to the first location in the specified direction, the method comprising the steps of:
taking at least one of a plurality of active areas in an order in which the active area would normally receive focus when the focus is moved nondirectionally,
determining a second location for the active area
comparing the second location with the first location;
identifying the active area that is in the specified direction and
moving the focus to the active area whose second location is closest in the specified direction to the first location.

22. The method set forth in claim 21 wherein the step of comparing the second location with the first location in the display comprises the steps of:
determining whether the second location is in the specified direction from the first location; and
if the second location is in the specified direction, determining the closeness of the second location to the first location.

23. A computer-readable medium having computer-executable instructions for performing the steps recited in claim 22.

24. The method set forth in claim 22 wherein the step of determining the closeness of the second location further comprises the steps of:
determining whether the second location is the closest second location yet found by comparing the second location with a current closest second location; and
if the second location is the closest second location yet found, making the second location the current closest second location; and
in the step of moving the focus, moving the focus to the current closest second location after the locations of all of the second locations have been compared with the first location in the display.

25. A computer-readable medium having-computer executable instructions for performing the steps recited in claim 24.

26. The method set forth in claim 22 wherein:
the step of determining the closeness of the second location to the first location does not require that the second location be in vertical or horizontal alignment with the first location.

27. The method set forth in claim 22 wherein each second location and the first location have associated therewith the x and y coordinates of a point in the second location or the first location and the step of determining the closeness of the second location further comprises the steps of:
deriving an x distance from the difference between the x coordinate of the point in the second location and the x coordinate of the point in the first location;
deriving a y distance from the difference between the y coordinate of the point in the second location and the y coordinate of the point in the first location; and
using the x distance and the y distance to compute the distance between the second location and the first location.

28. A computer-readable medium having-computer executable instructions for performing the steps recited in claim 27.

29. The method set forth in claim 27 wherein the step of determining the closeness of the second location further comprises the step of:
combining a biasing value with either the x distance or the y distance depending on the received direction.

30. A computer-readable medium having computer-executable instructions for performing the steps recited in claim 21.

31. A method of adapting a GUI for use with a pointing device that specifies a direction relative to one of a plurality of child windows of a parent window in a display, the method comprising:
determining a current location of a current child window having a focus in the display;
receiving a desired direction specifier from the pointing device for moving the focus to a desired child window in the display;
examining in a sequence each of the plurality of child windows surrounding the current child window in an order in which the child window would normally receive focus when the focus is moved nondirectionally by:
obtaining a next location of a next child window in the sequence;
determining whether the next location is in the same direction specified by the pointing device,
if the next location is in the same direction, determining a distance between the current location and the next location, and
determining whether the distance between the current location and the next location is less than a current shortest distance,
if the distance between the current location and the next location is less than the current short distance, making the next child window the desired child window; and
after each child window of the plurality of child windows surrounding the current child window in the sequence has been so examined, making the desired child window the current child window having the focus.

32. A computer-readable medium having computer-executable instructions for performing the steps recited in claim 31.

33. The method set forth in claim 31 wherein the sequence is circular and the step for examining in the sequence further comprises the step of:

ceasing to examine the plurality of child windows surrounding the current child window when a first window to be examined is again reached.

34. The method set forth in claim 31, wherein:
the step of determining the distance between the current location and the next location does not require that the next child window with the next location be in vertical or horizontal alignment with the current window having a current location.

35. A computer-readable medium having computer-executable instructions for performing the steps recited in claim 34.

36. The method set forth in claim 34 wherein said plurality of child windows have associated therewith x and y coordinates of a point in each respective child window and the step of determining the distance between the current location and the next location further comprises the steps of:
deriving an x distance from the difference between the x coordinate of the point in the next child window and the x coordinate of the point in the current child window;
deriving a y distance from the difference between they coordinate of the point in the next child window and the y coordinate of the point in the current child window; and
using the x and the y distance to compute the distance between the current location and the next location.

37. A computer-readable medium having computer-executable instructions for performing the steps recited in claim 36.

38. The method set forth in claim 36 wherein the step of determining the distance between the second location and the first location further comprises the step of:
combining a biasing value with either the x distance or the y distance depending on the received desired direction.

39. The method set forth in claim 31 wherein the locations of the plurality of child windows changes dynamically.

40. A computer-readable medium having computer-executable instructions for performing the steps recited in claim 39.

41. A method of adapting a GUI in which a focus is moved nondirectionally among a plurality of active areas located in a display such that the GUI can be used with a directional pointing device that specifies a desired direction relative to a current location in the display, the method comprising the steps of:
receiving an indication of the desired direction specified by the directional pointing device;
taking at least one of the active areas in an order in which the active areas would normally receive the focus when the focus is moved nondirectionally;
returning a location in the display for each of the active areas taken;
comparing the location of each active area taken with the current location in the display; and
making one of the plurality of active areas whose location in the specified direction is closest to the current location in the display, the active area with the focus,
wherein the step of comparing each active area's location comprises the steps of:
determining whether the active area is in the specified direction from the current location; and
if the active area is in the specified direction, determining the closeness of the active area to the location in the display,
and further wherein the step of determining whether the active area is in the specified direction from the current location comprises the steps of:
for a given specified direction, determining a position of a side of the current location which is farthest in the given specified direction and determining a position of a side of the active area which is farthest in a direction opposite to the given specified direction; and
determining that the active area is not in the specified direction if the position of the side of the active area is less far in the given specified direction than the side of the current location.

42. A computer-readable medium having computer-executable instructions for performing the steps recited in claim 41.

43. The method set forth in claim 41 wherein:
the position of the side of the current location and the position of the side of the active area are the current positions that the sides have in the display.

44. A method of adapting a GUI for use with a pointing device that specifies a direction relative to a window in a display, the GUI having active areas for a program that are child windows of a window in which a program is running and functions which, when given a specifier for a window, obtain a location of the specified window in the display, obtain a next window relative to the specified window in a sequence of the active areas, and move a focus of the display to the specified window and the method comprising the steps of:
receiving a direction specifier from the pointing device and a first specifier for the window in the display;
using the function for obtaining a location and the first specifier for obtaining a first location of the window in the display;
for each window in the sequence of active areas,
using the function for obtaining the next window to obtain a second specifier for a current active area,
using the function for obtaining the location and the second specifier to obtain a second location of the current active area in the display,
determining whether the second location is located in the direction specified by the direction specifier from the first location,
if the second location is so located, determining a distance between the second location and the first location, and
determining whether the distance between second location and the first location is less than a current shortest distance, and
if the second location has such a distance, making the specifier for the current active area the specifier for a current closest active area; and
after each window in the sequence has been examined, using the function for moving the focus and the specifier for the current closest active area to move the focus to the current closest active area,
wherein the step of determining whether the second location is in the specified direction from the first location comprises the steps of:
for a given specified direction, determining a position of a side of the window with the first location which is farthest in the given specified direction and determining a position of a side of the window with the second location which is farthest in a direction opposite to the given specified direction; and
determining that the second location is not in the specified direction from the first location if the position of the side of the window with the second location is less far in the given specified direction than the side of the window with the first location.

45. A computer-readable medium having computer-executable instructions for performing the steps recited in claim 44.

46. A method of using an input from a pointing device that specifies a direction relative to a first location in a display to move a focus to an active area of a plurality of active areas in the display that is the closest active area to the first location in the specified direction, the method comprising the steps of:

for each of the plurality of active areas in turn,
        determining a second location for the active area which is the closest to the first location and
        comparing the second location with the first location; and
        moving the focus to the active area whose second location is closest in the specified direction to the first location,
    wherein the step of comparing the second location with the first location in the display comprises the steps of:
        determining whether the second location is in the specified direction from the first location; and
        if the second location is in the specified direction, determining the closeness of the second location to the first location;
    and further wherein the step of determining whether the second location is in the specified direction from the first location comprises the steps of:
        for a given specified direction, determining a position of a side of the first location which is farthest in the given specified direction and determining a position of a side of the second location which is farthest in a direction opposite to the given specified direction and
        determining that the second location is not in the specified direction if the position of the side of the second location is less far in the given specified direction than the side of the first location.

47. A computer-readable medium having computer-executable instructions for performing the steps recited in claim 46.

48. A method for adapting a GUI for use with a pointing device that specifies a direction relative to one of a plurality of child windows of a parent window in a display, the method comprising:

determining a current location of a current child window having a focus in the display;
    receiving a desired direction specifier from the pointing device for moving the focus to a desired child window in the display;
    examining in a sequence each of the plurality of child windows surrounding the current child window by:
        obtaining a next location of a next child window in the sequence;
        determining whether the next location is in the same direction specified by the pointing device, this step further comprising the steps of:
            for a given specified, direction, determining a current position of a side of the current child window which is the farthest in the given specified direction and determining a next position of a side of the next child window with the next location which is farthest in a direction opposite to the given specified direction; and
            determining that the next location is not in the specified direction from the current location if the next position is less than in the given specified direction than the current position
        if the next location is in the same direction, determining a distance between the current location and the next location; and
    determining whether the distance between the current location and the next location is less than a current shortest distance,
        if the distance between the current location and the next location is less than the current short distance, making the next child window the desired child window; and
    after each child window of the plurality of child windows surrounding the current child window in the sequence has been so examined, making the desired child window the current child window having the focus.

49. A computer-readable medium having computer executable instructions for performing the steps recited in claim 48.

* * * * *

UNITED STATES PATENT AND TRADEMARK OFFICE
CERTIFICATE OF CORRECTION

PATENT NO.    : 6,072,485
DATED         : June 6, 2000
INVENTOR(S)   : David A. Barnes, et al.

It is certified that error appears in the above-identified patent and that said Letters Patent is hereby corrected as shown below:

<u>Claim 36, column 13,</u>
Line 20, "they" has been replaced with -- the y --.

<u>Claim 48, column 16,</u>
Line 15, "," (first occurrence) has been deleted.

Signed and Sealed this

Eighteenth Day of September, 2001

Attest:

NICHOLAS P. GODICI
*Attesting Officer*    *Acting Director of the United States Patent and Trademark Office*